United States Patent [19]

Haskett et al.

[11] 3,840,705

[45] Oct. 8, 1974

[54] DATA CHANNEL UNIT FOR A PCM TDM SYSTEM

[75] Inventors: William Frank Haskett, Suncook; Harold Frederick Wochholz, Durham, both of N.H.; Dixon Brown Penick, Andover, Mass.

[73] Assignee: Northeast Electronics Corporation, Concord, N.H.

[22] Filed: Aug. 16, 1972

[21] Appl. No.: 281,195

[52] U.S. Cl. .......... 179/15 A, 179/15 AF

[51] Int. Cl. .......... H04j 3/00

[58] Field of Search .......... 179/15 A, 15 AF, 15 AP, 179/15 BM, 15 BA, 15 BV, 15 BY

[56] References Cited

UNITED STATES PATENTS

| | | | |
|---|---|---|---|
| 3,136,861 | 6/1964 | Mayo | 179/15 BS |
| 3,575,557 | 4/1971 | McCowen | 179/15 AF |
| 3,660,606 | 5/1972 | DeWitt | 179/15 BA |
| 3,663,760 | 5/1972 | DeWitt | 179/15 AF |
| 3,683,115 | 8/1972 | Schellenberg | 179/15 BF |

OTHER PUBLICATIONS

"T1 Span Line Switching System;" Lynch Communication Systems Catalog; October 1, 1971; Publication B301; Section 4, page 2002.

Transmission Systems for Communications; Bell Telephone Laboratories, Inc.; 1970; pp. 553–565.

*Primary Examiner*—David L. Stewart
*Attorney, Agent, or Firm*—Cooper, Dunham, Clark, Griffin & Moran

[57] ABSTRACT

A data terminal is disclosed, containing internal clocks, which is designed to replace conventional audio channel units of the D1 channel bank of the Bell System T1 carrier system, to permit the transmission of data.

8 Claims, 6 Drawing Figures

DATA CHANNEL UNIT FOR A PCM TDM SYSTEM

This invention pertains to pulse code modulated, multiplexed communication systems, and provides improved methods and apparatus for transmission of data thereover.

The invention is particularly applicable to the transmission of data over the Bell System's PCM, T1 Carrier System as described in the Bell System Technical Journal (B.S.T.J.) for January 1962, pp. 1–24, and for September 1965, pp. 1405–1451.

An object of the invention is to provide methods and means for transmitting a data stream over the T1 carrier system by displacement of only one voice channel for each data stream.

A further object is to provide self-contained, plug-in, transmitter and receiver modules which may be inserted in the D1 bank of the T1 carrier system.

The data terminals of the invention are arranged to be connected to the T1 carrier system at an access point in the D1 channel bank itself. The data multiplexing circuits for both transmitting and receiving a single data stream in each direction are built into a channel unit frame, which may be plugged into a channel unit position directly.

A feature of this arrangement is that the circuitry contained in the plug-in unit completely bypasses the D1 bank companding and encoding functions, and the consequent transmission distortion introduced in these functions when they are not perfectly adjusted.

Timing is established by the channel pulse already wired in the D1 bank to the channel unit position, and operating power is taken from the battery connection already wired in. The simplicity of this arrangement in accordance with the invention, is that it requires the disconnection of only one wire from the back bay wiring of the selected channel position, and the addition of two wires connecting the proper terminals to the D1 bank common equipment. These changes can be made while the D–1 bank is in operation and without disturbing transmission on any other channels.

The data terminals are arranged for full duplex operation, and include self-check features of the invention, controlled by switches for both end-to-end and loop around testing. The data terminals according to the invention are adapted to synchronize their data streams with the T1 bit stream.

Data transmitting and data receiving devices may operate in accordance with the invention at data rates normally acceptable for transmission over voice transmission paths. Such rates typically, may comprise 1.2, 2.4, 4.8, or 9.6 kb/s or other intermediate rates. One variation of the invention accepts data signals at any such rate in a transmitter module for transmission as described below to a receiver module for restoration to its original form.

Other data transmitting and data receiving devices may operate at higher data rates requiring wideband transmission facilities. Such rates, typically, may be 40.8, 50, 56, or 64 kb/s or similar rates. Another variation of this invention accepts data signals at any one of these higher rates in a transmitter module for transmission as described below to a receiver module for restoration to its original form. In certain cases it will be necessary to provide a precise synchronizing clock signal from the transmitter module to the data transmitting device and from the receiver module to the data receiving device, such synchronizing clock sources being a part of this invention.

In the accompanying drawings the invention will be described as applied to operation at a data rate of a nominal 50 kilobits per second, and wherein.

Figure 1:
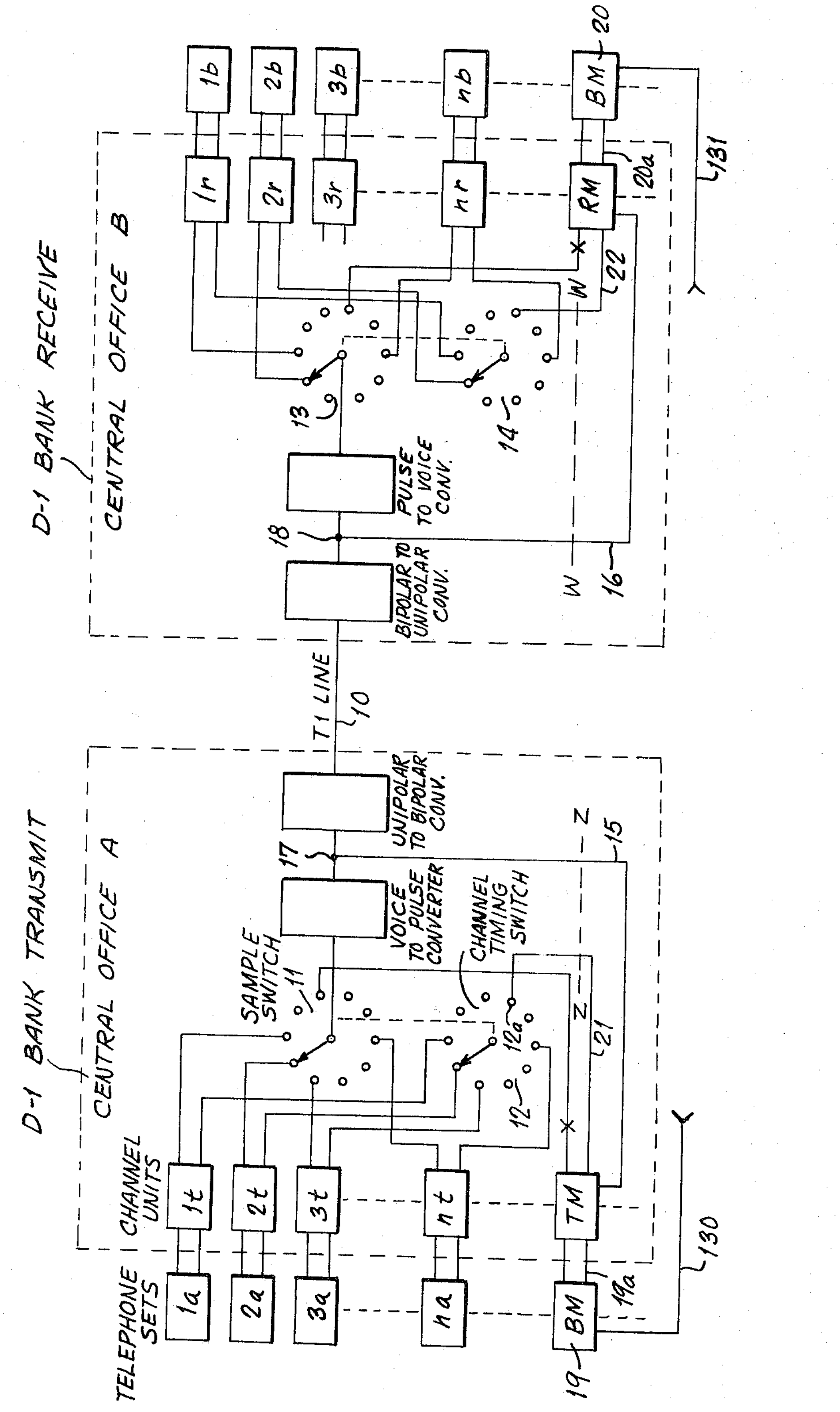
FIG. 1 is a block diagram layout of the T1 carrier system incorporating the present invention.

Referring to FIG. 1, a PCM multiplex T1 carrier line 10, is shown extending between central offices A and B, and terminating in office A in the D–1 bank transmitting apparatus and in office B in the D–1 bank receiving apparatus, it being understood of course that for the opposite direction of transmission the apparatuses shown are reversely duplicated in offices B and A, respectively.

Considering transmission in the direction of offices A to B, for PCM voice transmission, one or more telephone stations, as at 1*a*, 2*a*, 3*a*, etc., may be connected to the transmit channel units 1*t*, 2*t*, 3*t*, etc. at office A; while a corresponding number of telephone stations, as at 1*b*, 2*b*, 3*b*, etc. would be connected to receive channel units, as at 1*r*, 2*r*, 3*r*, etc. at office B.

The channel units are shown as conventionally wired to the "sample" and "channel" timing switches 11, 12 and 13, 14, at offices A and B, respectively, for PCM voice transmission. The switches 12–14 inc. may be electronic commutators or other types known to the art.

For data transmission in accordance with the present invention, a voice channel is pre-empted, and transmit and receive modules in accordance with the invention substituted for the channel units of that channel at offices A and B respectively, as at TM and RM. The conventional connections marked X in these channel units are not used and connections 15 and 16 added, the first of which extends from the transmitter module TM to the +PCM connection 17, between the "voice-to-pulse-converter" and the "unipolar-to-bipolar-converter" of the D–1 transmitting bank at office A; and the second of which extends from the receiver module RM to the +PCM connection 18 between the "bipolar-to-unipolar-converter" and the "pulse-to-voice-converter" of the D–1 receive bank at office B, as shown in the drawing.

For transmission of data over the thus pre-empted channel, a data transmitting device, such as a business machine BM as at 19, may be connected to the transmitting module TM at office A, over line 19*a*, and a data receiving device, such as a business machine BM as at 20, may be connected over a line 20*a* to the receiving module RM at office B.

The transmitter module TM is operative as hereafter explained with reference to FIGS. 2–4 inc., to receive a data stream from unit 19 at a nominal 50 kb/s bit rate and transmit this data at a nominal 56 kb/s rate via connection 15 over the T1 line 10 in response to the channel timing pulses received over connection 21 from the channel timing switch. Conversely, the receiver module RM is operative in response to the channel timing pulse via connection 22 at the receiving end, to transmit the nominal 56 kb/s incoming data stream to unit 20 at the nominal 50 kb/s bit rate generated by unit 19, at the transmitting end.

Figure 2:
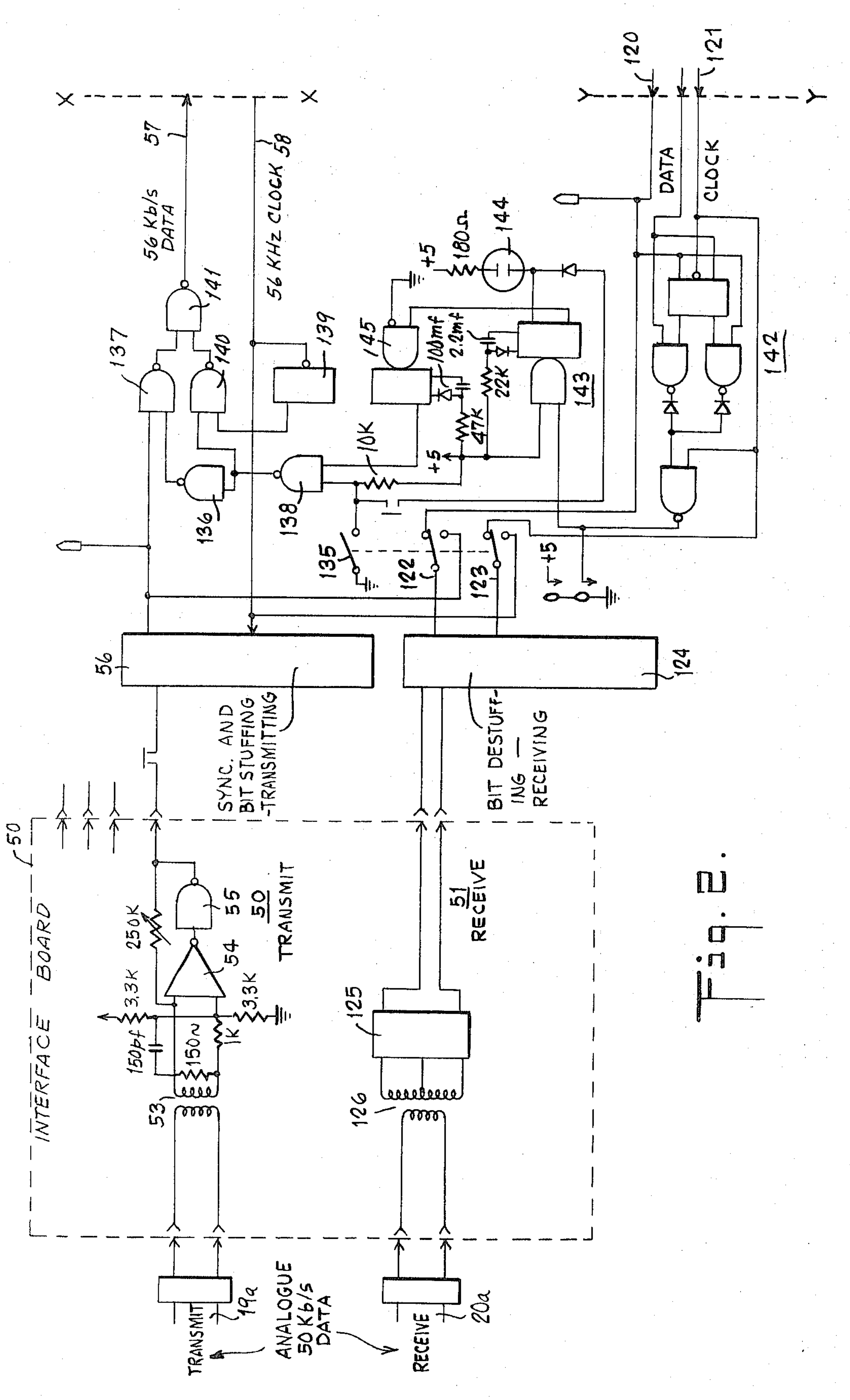
FIG. 2 is a circuit diagram showing the central office interface connections between the transmitting and receiving modules of the invention and user lines extending to and from one end of the T1 carrier terminal.
Figure 3:
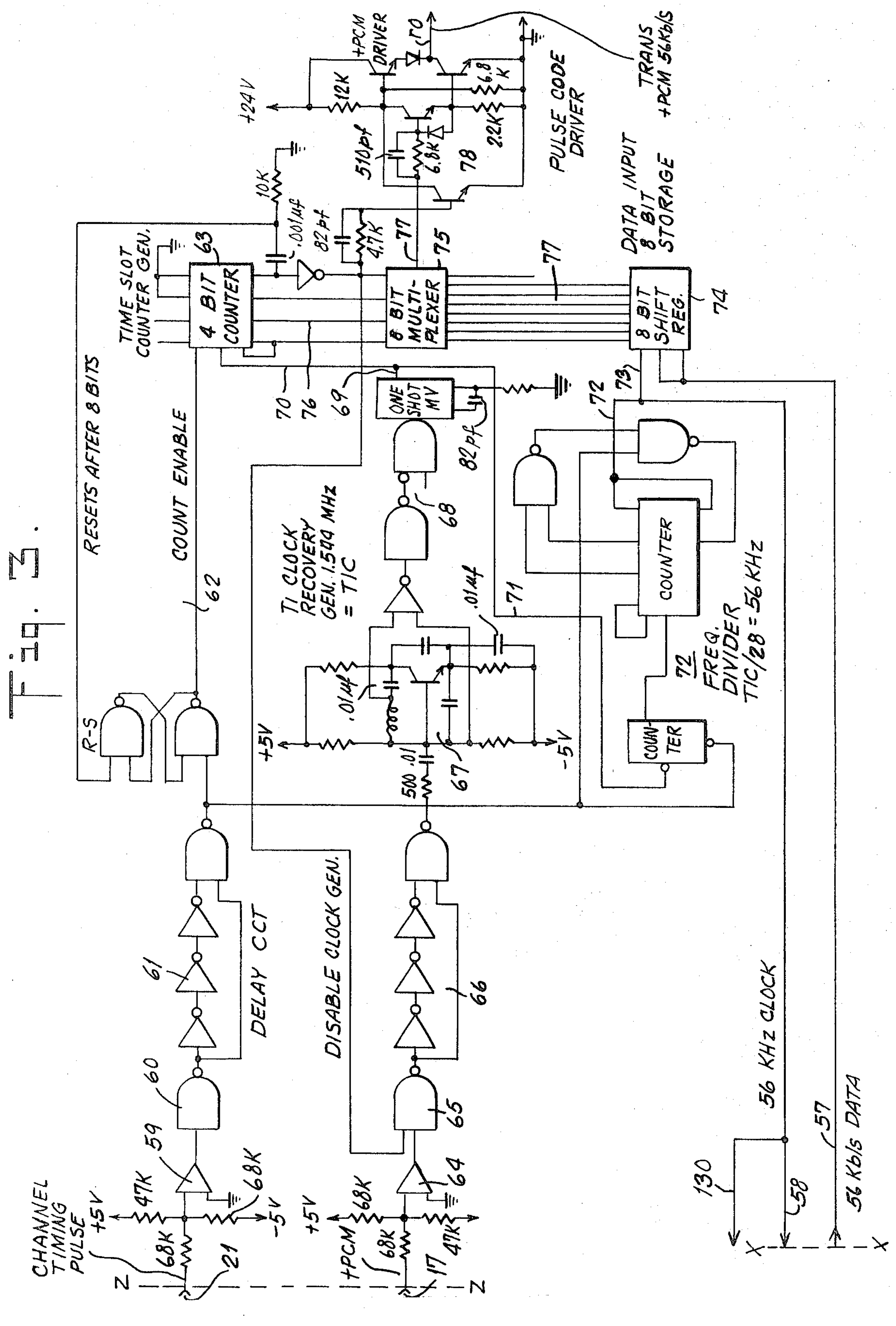
FIGS. 3 and 4 are continuations of the FIG. 2 circuitry as taken at X—X and Y—Y of each, respectively, FIGS. 3 and 4 in turn being extensions of FIG. 1 as taken at Z—Z and W—W of each, respectively.
Figure 4:
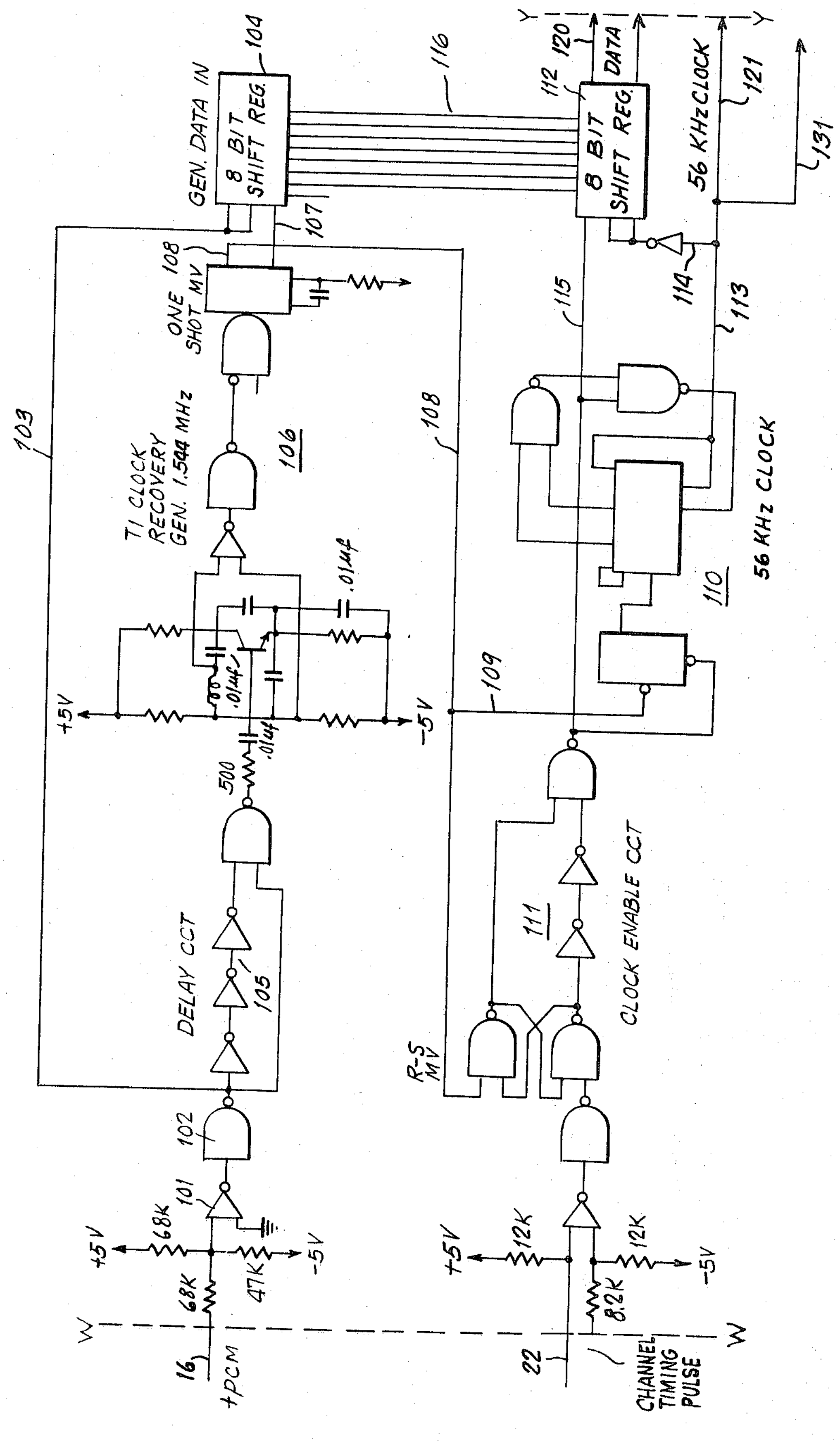

Referring to FIGS. 2–4 inc., the invention provides at each central office termination of the T1 carrier, both transmitting and receiving modules according to the invention as shown at 50, FIG. 2 in part, and in FIG. 3, for transmitting; and as shown at 51, FIG. 2 in part, and in FIG. 4, for receiving.

Assume for purposes of explanation that a data stream incoming at 50 kb/s over a user's line 19*a*, FIGS. 1 and 2, to a central office A located at one end of the T1 carrier, is transmitted at 56 kb/s thereover to a central office B located at the opposite end of the T1 carrier line, and transmitted thence at 50 kb/s over user's line 20*a* to station 20, FIGS. 1 and 2.

As shown in FIG. 2, the 50 kb/s data stream incoming over user's line 19*a*, is fed via transformer and slicer elements 53, 54, 55, and thence as a 50 kb/s square wave signal, to a synchronizing and bit stuffing apparatus 56, such as that described in U.S. Pat. No. 3,136,861, wherein it is converted into a 56 kb/s data stream, exiting over line 57. As hereinafter explained with reference to FIG. 3, clock pulses of 56 kHz are supplied to the bit stuffing unit 56 via connection 58 for generating the 56 kb/s data stream.

Referring now to FIGS. 1 and 3, the +PCM data stream in line 17 of FIG. 1, is fed as in FIG. 3, via slicer and pulse generator 64–66, to a T1 clock recovery unit consisting of a resonant circuit 67, tuned to 1.544 MHz and a wave shaping circuit 68, for producing at 69, a square wave clock signal of 1.544 MHz. This clock signal is transmitted to a four bit binary counter 63 over a connection 70, and is also supplied over a connection 71, to a frequency divider circuit 72 which divides the T1 clock signal by 28 and synchronizes it by the channel timing pulse to generate at its output 72, a 56 kHz clock signal which is supplied via connection 58 to the bit stuffing unit 56 of FIG. 2.

Referring to FIGS. 1 and 3, each time the channel timing switch 12, FIG. 1, contacts switch contact 12*a* of the pre-empted channel 19, a channel timing pulse is transmitted via connection 21 and thence referring to FIG. 3, via amplifier, inverter and delay units 59–61 inc., and a count enable circuit 62, to the 4 bit counter 63. Counter 63 counts the 1.544 MHz clock pulses impressed thereon in response to the channel timing pulses. Meantime the 56 kb/s data stream incoming over line 57 from FIGS. 2 to 3, is transmitted to an 8 bit shift register 74, FIG. 3, along with the 56 kHz clock pulses via connections 72 and 73. Counter 74 stores seven bits of data between successive channel pulses impressed on counter 63 at the rate of 8,000 per second. The counters 63 and 74 are connected to an 8 bit multiplexer via connections 76 and 77. Each time the count in counter 63, shows that the channel timing switch is in contact with the pre-empted channel, register 63 activates the multiplexer to transmit thereto the data stored in register 74, and to transmit this data via output connection 77 therefrom and through a driver circuit 78 to the carrier line 10 for transmission thereover, while overriding any signal supplied by the D1 bank common equipment. Driver circuit 78 normally exhibits to a high output impedance but switches to a low impedance state when activated by counter 63.

Referring to FIGS. 1 and 4, the unipolar, plus PCM 1.544 kb/s data stream incoming on line 16, from carrier line 10, is after amplification and inversion in units 101, 102, impressed in part via connection 103 on an 8 bit shift register 104, and is also impressed in part via a delay circuit 105, on a T1 clock recovery generator circuit 106 similar to that above described, which generates a clock frequency of 1.544 MHz, impressed on register 104 via connection 107.

This T1 clock signal is also impressed via connections 108, 109, on a frequency divider, counter circuit 110 for generating a clock frequency of nominal 56 kHz. This clock is activated by the channel timing pulses in line 22, FIGS. 1 and 4, via a pulse generator circuit 111. The clock output is connected to an 8 bit shift register 112 via 113, 114, and the pulse generator circuit is also connected thereto via line 115. Connections 116 extend between the shift registers 104 and 112.

Register 104 stores the last 8 bits of 1.544 MHz data and when a timing signal is received via connection 22, the data content of register 104 is transferred to register 112. The data thus shifted into register 112 is transmitted thence via its output circuit 120 to the receiving circuit of FIG. 2, along with the 56 kHz clock signal via connection 121.

Referring now to FIG. 2, the 56 kb/s data and 56 kHz clock signals in lines 120 and 121, are fed via connections 122, 123, to a bit destuffing apparatus 124 such as is described in said U.S. Pat. No. 3,136,861, which includes a phase-locked-loop, for restoring the initially transmitted 50 kb/s data stream and transmitting it thence via a line driver 125, transformer 126 and the receiver circuit 20*a* to the receiving station 20 of FIG. 1.

Referring to FIGS. 1 and 3, a connection 130 may be extended from the 56 kHz clock line 58 to the business machine 19 for clocking in data therefrom at the 56 kb/s rate. At the receiving end referring to FIGS. 1 and 4, a connection 131 may be extended from the 56 kHz clock line 113 to the business machine 20 for clocking out data thereto at the rate of 56 kb/s.

Referring to FIG. 2 the self check feature above mentioned is as follows. Manual depression of switch 135 disables normal nominal 56 kb/s data through gate 137 by the inverting and inhibiting actions of gates 138 and 136 respectively. Gate 138 also enables a test data signal sequence output from a generator 139 to be connected to the normal nominal 56 kb/s input 57 via gates 140 and 141.

In the receiving section at the other end of the line, which is identical to the receiving section at the bottom of FIG. 2, this test data is monitored by detection and timing circuits 142, 143. Upon receipt of this data for a prescribed length of time, light 144 is lit, and a timing circuit 145, disables for an arbitrary time, normal transmission of data via 136–138 and enables the test data signal 139 to be inserted at 57 via gates 140 and 141. Thus reception of a test data sequence at the receiving end causes an automatic loop around by logically performing the identical functions of the previously described pushbutton. This automatic loop around is terminated by the release of switch 135.

Figure 6:
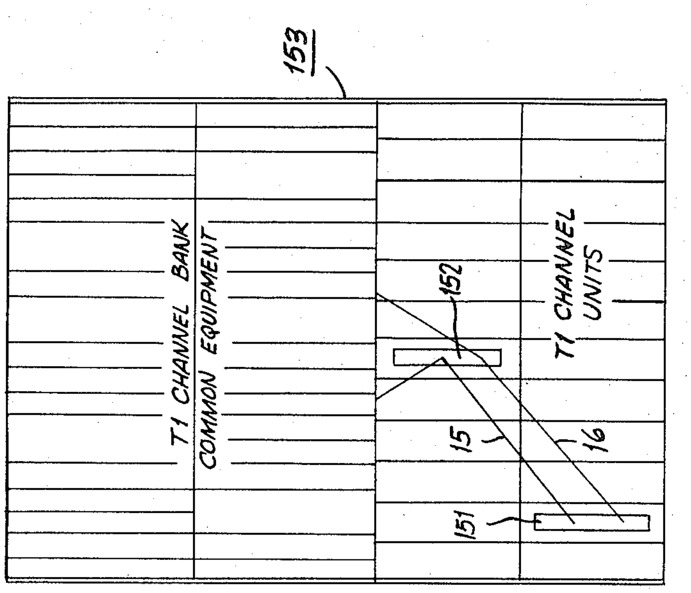
FIG. 6 is a view in elevation of the T1 channel bank showing modules of FIG. 5 mounted therein.
Figure 5:
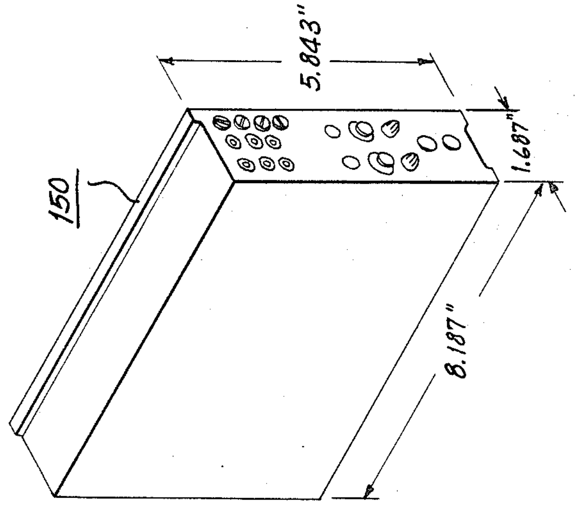
FIG. 5 is a perspective view of a transmitter-receiver module according to the invention.

Referring to FIG. 5, there is shown in perspective at 150, a transmitter-receiver module according to the invention, with the dimensions indicated in inches for the height, length and widths. FIG. 6 shows at 151, 152, the manner in which the units 150, are substituted for T1 channel units in the T1 channel bank 153. The wires 15 and 16 of FIG. 6 are those shown in FIG. 1 for connecting units 151 and 152 to the +PCM points 17 and 18 of FIG. 1.

What is claimed is:

1. A data terminal for replacing a selected channel unit of a multiplex PCM carrier transmission system which has:

a common transmission line;

a plurality of transmitting channel units each providing a low rate bit stream buffered in an output buffer;

a central channel clock and a channel switch responsive thereto for multiplexing the channel units by connecting the output buffer of each channel unit to the transmission line only during a channel pulse allotted to that channel unit; and a central data clock for clocking the contents of the output buffer connected to the transmission line at a high rate, to thereby transmit over said line a high rate multiplexed bit system;

said data terminal having a transmitter comprising:

means for generating a bit stream;

means for buffering the bit stream;

first internal clock means, distinct from said central clocks, for generating a first clock train;

means for clocking the bit stream from the generating means into the buffering means at the frequency of said first clock train;

second internal clock means, distinct from said central clocks, for generating a second pulse train at the frequency of the transmission line;

means responsive to a selected channel pulse of the central channel clock for connecting the buffering means to the transmission line for the duration of the last recited pulse;

means for clocking the contents of the buffering means onto the transmission line at the frequency of the second pulse train for the duration of said selected channel pulse; and means for synchronizing the first and second internal clock means with the frequency of at least one of said central clocks.

2. A data terminal as in claim 1 wherein the synchronizing means includes means for synchronizing the first and second internal clock means with the transmission rate of the bit stream on the transmission line.

3. A data terminal as in claim 1 wherein the first clock train from the first internal clock means is at approximately 56 KHz and the second pulse train from the second internal clock means is at approximately 1.544 MHz.

4. A data terminal as in claim 1 wherein the carrier system includes:

a plurality of receiving channel units;

a second central channel clock and a channel switch responsive thereto for demultiplexing the composite bit stream by connecting each receiving channel unit to the transmission line only during a channel pulse allotted to the receiving channel unit; and a second central data clock for clocking the bit stream carried by the transmission line into the channel units, and wherein the data terminal has a receiver comprising:

an input buffer and a receiving unit;

third internal clock means, distinct from said central clocks, for generating a third pulse train at the frequency of the bit stream on the transmission line;

fourth internal clock means, distinct from said central clocks, for generating a fourth pulse train at a substantially lower frequency than the third pulse train;

means responsive to a selected channel pulse of the second central channel clock for connecting the input buffer to the transmission line and for transferring into the input buffer the bit stream carried by the transmission line for the duration of said selected channel pulse, said transfer taking place at the frequency of said third clock pulse train;

means for transferring the contents of the input buffer to the receiving unit at the frequency of said fourth clock pulse train; and means for synchronizing the third and fourth internal clock means with at least one of said central clocks.

5. A data terminal as in claim 4 wherein the last recited synchronizing means synchronizes the third and fourth internal clock means with the bit rate of the bit stream on the transmission line.

6. A data terminal as in claim 5 wherein the last recited synchronizing means includes means for connecting the third and fourth internal clock means with the transmission line for recovery of the transmission line frequency.

7. A data terminal as in claim 4 including testing means comprising:

a test signal source;

means for preventing the connection of the generating means to the buffering means and for connecting the test signal source to the buffering means to thereby cause the data terminal transmitter to apply said test signal to the transmission line; and detecting means at the receiver connected to the input buffer and responsive to the receipt of said test signal from the transmission line into the input buffer to provide an indication thereof.

8. A data terminal for replacing a channel unit of a PCM carrier system which includes:

a transmission line carrying a multiplexed bit stream;

a plurality of channel units;

a central channel clock and a channel switch responsive thereto for demultiplexing the transmission line bit stream by connecting each of the channel units to the transmission line only during a channel pulse allotted to that channel unit; and a central data clock for clocking the bit stream from the transmission line into the channel unit connected thereto, said data terminal comprising:

an input buffer and a receiving unit;

first internal clock means, distinct from said central clocks, for generating a first pulse train at the frequency of the bit stream on the transmission line;

second internal clock means, distinct from said central clocks, for generating a second pulse train at a substantially lower frequency than the first pulse train;

means responsive to a selected channel pulse of the central channel clock for connecting the input buffer to the transmission line and for transferring into the input buffer the bit stream carried by the transmission line for the duration of said selected channel pulse, said transfer taking place at the frequency of said first clock pulse train;

means for transferring the contents of the input buffer to the receiving unit at the frequency of said second clock pulse train; and means for synchronizing the first and second internal clock means with the bit rate of the bit stream on the transmission line.

* * * * *